US008773736B2

(12) United States Patent  
Goto (10) Patent No.: US 8,773,736 B2  
(45) Date of Patent: Jul. 8, 2014

(54) IMAGE READING APPARATUS

(75) Inventor: Tomohiko Goto, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 342 days.

(21) Appl. No.: 13/043,905

(22) Filed: Mar. 9, 2011

(65) Prior Publication Data

US 2012/0081763 A1 Apr. 5, 2012

(30) Foreign Application Priority Data

Sep. 30, 2010 (JP) ................................. 2010-220501

(51) Int. Cl.
| | |
|---|---|
| H04N 1/04 | (2006.01) |
| G06F 3/12 | (2006.01) |
| B65H 7/08 | (2006.01) |
| B65H 5/22 | (2006.01) |
| B65H 29/00 | (2006.01) |
| G03G 15/00 | (2006.01) |
| B65H 33/04 | (2006.01) |

(52) U.S. Cl.
USPC .......... 358/498; 358/1.13; 358/474; 271/110; 271/3.14; 271/186; 399/371; 399/367; 270/58.12

(58) Field of Classification Search
USPC ........ 358/498, 1.13, 474; 271/110, 3.14, 186; 399/371, 367; 270/58.12
See application file for complete search history.

(56) References Cited

U.S. PATENT DOCUMENTS

| 5,799,237 | A | * | 8/1998 | Ueda et al. .................... 399/367 |
|---|---|---|---|---|
| 6,098,977 | A | * | 8/2000 | Sato et al. ..................... 271/186 |
| 2004/0212139 | A1 | * | 10/2004 | Nagao et al. .................. 271/110 |
| 2005/0042005 | A1 | * | 2/2005 | Imai et al. ..................... 399/371 |
| 2007/0063413 | A1 | * | 3/2007 | Terao et al. ................ 270/58.12 |
| 2008/0111293 | A1 | * | 5/2008 | Shingai ........................ 271/3.14 |
| 2010/0225977 | A1 | * | 9/2010 | Osanai et al. ................. 358/474 |
| 2012/0212765 | A1 | * | 8/2012 | Ohtsu .......................... 358/1.13 |

FOREIGN PATENT DOCUMENTS

| CN | 101355621 A | 1/2009 |
|---|---|---|
| JP | 2003-125157 | 4/2003 |
| JP | 2005-073135 | 3/2005 |

OTHER PUBLICATIONS

First Office Action in Chinese Counterpart No. 201110082408.4 dated Jan. 6, 2014.

* cited by examiner

Primary Examiner — Charlotte M Baker  
Assistant Examiner — Rury Grisham  
(74) Attorney, Agent, or Firm — Banner & Witcoff, Ltd.

(57) ABSTRACT

An image reading apparatus to convey a sheet to be scanned to an image reader unit is provided. the image reading apparatus includes a sheet tray, in which the sheet to be scanned is stored, a separator, which frictionally picks up the sheet from the sheet tray and conveys the picked-up sheet toward an entry side of the image reader unit, through which the sheet enters a position above the image reader unit, to have a first side of the sheet scanned by the image reader unit, and a resisting force applier, which applies convey-resisting force to the sheet, of which first side has been scanned, being returned to the entry side of the image reader unit to have a second side of the sheet with the convey resistance scanned by the image reader unit.

5 Claims, 8 Drawing Sheets

IMAGE READING APPARATUS

CROSS REFERENCE TO RELATED APPLICATION

This application claims priority from Japanese Patent Application No. 2010-220501, filed on Sep. 30, 2010, the entire subject matter of which is incorporated herein by reference.

BACKGROUND

1. Technical Field

An aspect of the present invention relates to an image reading apparatus, which is capable of reading images from either side of a sheet.

2. Related Art

An image reading apparatus capable of reading an original image from either side of an original sheet is known. The image reading apparatus may sequentially read images from both sides of the original sheets. When the images on the sheet are read, the sheet may be carried to an image reader unit with a first side (e.g., recto) facing the image reader unit to have the image on the recto read by the image reader unit. Thereafter, the sheet may be reversed to have a second side (e.g., verso) to face the image reader unit. The reversed sheet may be carried to the image reader unit so that the image formed on the verso is read by the same image reader unit. When the images on the two sides are read sequentially, therefore, the sheet with the recto facing the image reader unit and the sheet with the verso facing the image reading unit may be carried to the image reader unit in different sheet conveyer paths.

Due to the difference of the sheet conveyer paths, convey resistance generated with the original sheet and conveyer members (e.g., sheet-conveyer rollers) may vary between the recto-image reading and the verso-image reading, and a first sheet conveying speed to convey the sheet for the recto-image reading and a second sheet conveying speed to convey the sheet for the verso-image reading may vary. When the two sheet conveying speeds are different, magnification ratios of reproduced images to the original images may be different between the reproduced recto and the reproduced verso.

In order to set off the speed difference, for example, an image reading apparatus may be equipped with a mechanism to detect the actual first sheet conveying speed and the second sheet conveying speed and control peripheral speeds of the sheet-conveyer rollers based on the detected actual speeds so that the first and the second sheet conveying speeds become equivalent.

SUMMARY

When the image reading apparatus is equipped with such a mechanism to detect the sheet conveying speeds and adjust rotation of the sheet-conveyer rollers, a complicated controlling system is required in the image reading apparatus.

In view of the difficulty, the present invention is advantageous in that an image reading apparatus, which can restrict difference in magnification ratios between the two sides of a sheet in a less complicated controlling system, is provided.

According to an aspect of the present invention, an image reading apparatus, which is capable of conveying a sheet in a sheet-conveying path along an image reader unit in a predetermined sheet-conveying direction to scan a first side of the sheet passing by the image reader unit and returning the passed-by sheet to the image reader unit to scan a second side of the sheet after scanning the first side of the sheet, is provided. The image reading apparatus includes a sheet tray, in which the sheet to be scanned is stored, a separator, which is configured to frictionally pick up the sheet from the sheet tray and convey the picked-up sheet toward an entry side of the image reader unit, through which the sheet enters a position above the image reader unit, to have the first side of the sheet scanned by the image reader unit, and a resisting force applier, which is configured to apply convey-resisting force to the sheet, of which first side has been scanned, being returned to the entry side of the image reader unit to have the second side of the sheet with the convey resistance scanned by the image reader unit.

DETAILED DESCRIPTION

Hereinafter, embodiments of the present invention will be described with reference to the accompanying drawings. An image reading apparatus 100 is an image scanner to read an original image in an original document. The original document may include one or more sheets, on which the original images are formed. The original images may be formed on one side or both sides of the sheet. The image reading apparatus 100 has an auto document feeder (ADF), which conveys the sheet along a sheet conveying-path and reads the original image whilst the sheet is moved, and a flatbed reader, which reads the original image from the sheet whilst the sheet is placed still on a flatbed.

First Embodiment

1. Overall Configuration of the Image Reading Apparatus

Firstly, an overall configuration of the image reading apparatus 100 will be described. The image reading apparatus 100 includes a body 101, a still-sheet reader window 102, on which the sheet is placed still in a still-image reading operation to have the image appearing on the placed sheet read by a moving image capturing element 105, and an auto-conveyed image reader window 103, over which the sheet is conveyed in one way in an auto-reading operation to have the image appearing on the conveyed sheet scanned and read by the still-placed image capturing element 105, in the body 101. The still-sheet reader window 102 and the auto-conveyed image reader window 103 are sealed with platens 102A, 103A, which are made of a transparent material such as glass and acrylic resin.

Whilst the sheet conveyed in the sheet-conveying path passes over the auto-conveyed image reader window 103 in one way, according to the present embodiment, the auto-conveyed image reader window 103 has an entry side, from which the sheet enters the position above the auto-conveyed image reader window 103, and an exit side, from which the sheet passing over the auto-conveyed image reader window 103 exits the position above the auto-conveyed image reader window 103.

The body 101 includes a document cover 104, which covers the still-sheet reader window 102 and the auto-conveyed image reader window 103, on an upper section of the body 101. The document cover 104 is rotatable about one edge (e.g., a lateral edge) thereof to be openable and closable with respect to the still-sheet reader window 102 and the auto-conveyed image reader window 103. When the image is read from the still-placed sheet in the still-image reading operation, the document cover 104 is opened to expose the still-sheet reader window 102, and the sheet is set on the still-sheet reader window 102 with the image facing downward to be read by the image capturing element 105.

In the image reading apparatus 100, light is emitted to the sheet, and the light reflected on a surface of the sheet is received by the image capturing element 105, which generates electrical signals representing to the received light. Thus, the image appearing on the sheet is read and converted into electrical signals in the image reading apparatus 100. The electrical signals representing the scanned image are used to, for example, reproducing the scanned image.

Figure 1:
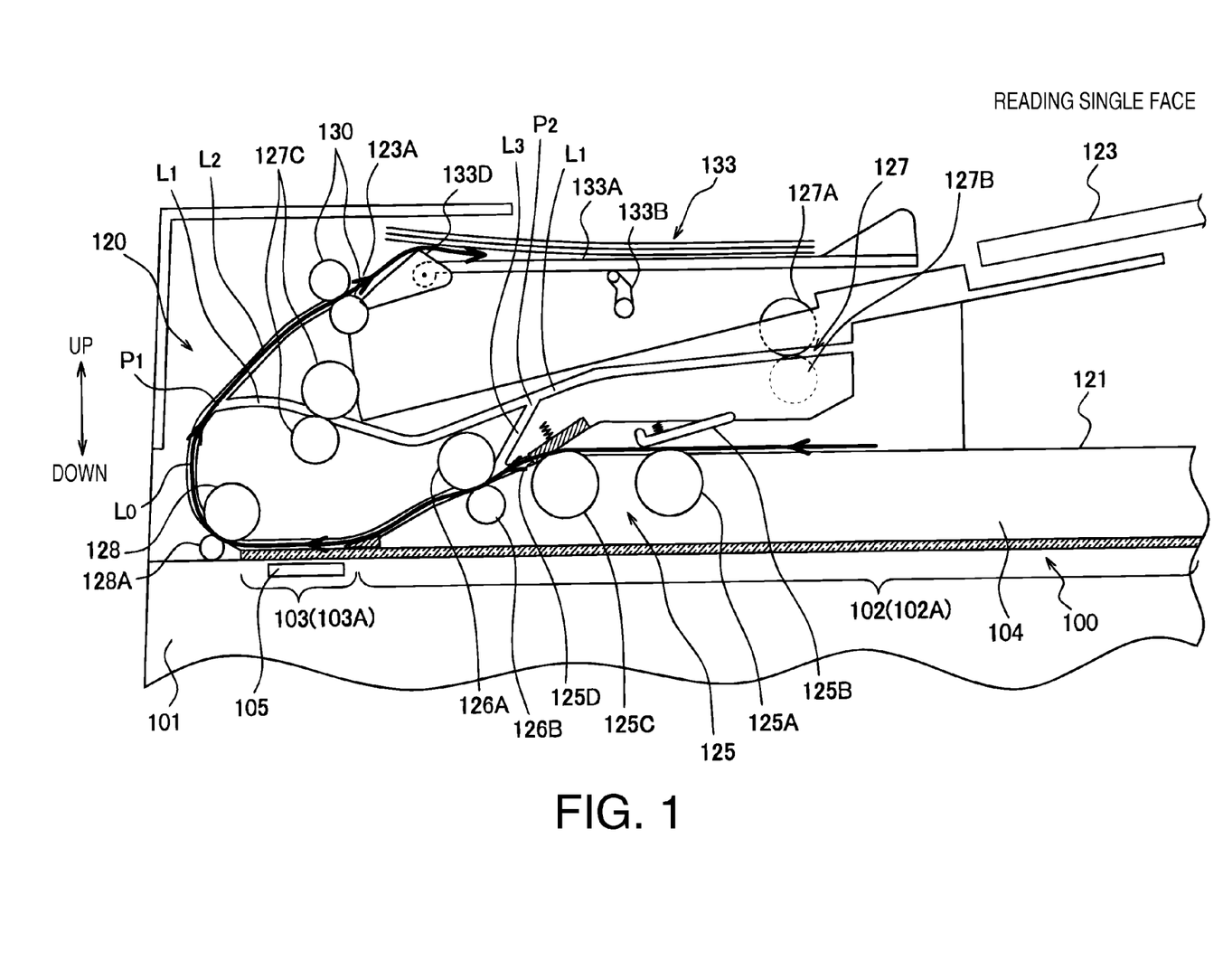
FIG. 1 is a cross-sectional view of an auto-document feeder (ADF) and a sheet conveyer path to be used for single-face reading in an image reading apparatus according to an embodiment of the present invention.

The image capturing element 105 is movably installed in the body 101 to move linearly in a longitudinal direction (i.e., a right-left direction in FIG. 1) of the image reading apparatus 100. During the auto-image reading operation, the image capturing element 105 is disposed directly under the auto-conveyed image reader window 103 to read the image from the sheet being conveyed. During the still-image reading operation, the image capturing element 105 is moved underneath the still-sheet reader window 102 to read the image appearing on the still-placed sheet.

The cover 104 includes an auto document feeder (ADF) 120, which automatically conveys the sheet to the auto-conveyed image reader window 103, in a position above and surrounding the auto-conveyed image reader window 103.

2. ADF 2.1 Configuration of the ADF

The ADF 120 includes a sheet-feed tray 121, on which the sheet to be scanned is placed, and a discharge tray 121, in which the sheet having been scanned in the image reading apparatus 100 is released. The sheet-feed tray 121 is arranged on top of the cover 104, and the discharge tray 123 is arranged in a position above the sheet-feed tray 121. The sheet is conveyed in the ADF 120 along a sheet-conveying path, which is indicated by a thick arrow (see FIG. 1). In other words, the sheet-feed tray 121 is a most upstream position in the sheet-conveying path and an inlet for the sheet of the sheet-conveyer path, and the discharge tray 123 is a most downstream position in the sheet-conveying path and a terminal of the sheet-conveyer path. When the original document includes a plurality of sheets, the sheets are stacked in vertical layers in the sheet tray 121 and the discharge tray 123.

The ADF 120 is provided with a feeder system 125 in the sheet-feed tray 121 in a position closer to the auto-conveyed image reader window 103. The feeder system 125 frictionally picks up a lowermost sheet from the original document in the sheet-feed tray 121 and conveys the picked-up sheet toward the auto-conveyed image reader window 103 along the sheet-conveying path to feed the sheet to the image capturing element 105. The feeder system 125 includes a pickup roller 12A, a nipping piece 125B, a separator roller 125C, and a separator pad 125D.

The pickup roller 125A is partially exposed from a bottom of the sheet-feed tray 121 to become in contact with a lower surface of the lowermost sheet. The nipping piece 125B applies pressure to the sheets in the sheet-feed tray 121 and presses the sheets against the pickup roller 125A. As the pickup roller 125A rotates counterclockwise (see FIG. 1), the lowermost sheet pressed against the pickup roller 125A is frictionally picked up and moved in the sheet-conveying path toward the separator roller 125C.

The separator roller 125C is partially exposed from the bottom of the sheet-feed tray 121 to become in contact with the lower surface of the sheet picked up and conveyed by the pickup roller 125A. The separator pad 125D is arranged to become in contact with an upper surface of the sheet conveyed by the pickup roller 125A or an upper surface of the other sheets in the sheet stack accompanying the lowermost sheet. The separator pad 125D presses the sheet(s) against the separator roller 125C by own weight thereof and by resilient force of, for example, a spring (unsigned). As the separator roller 125C rotates, solely the lowermost sheet, which is in contact with the separator roller 125C amongst the sheets in the sheet stack, is separated from the other sheets by friction caused amongst the sheets, the separator roller 125C, and the separator pad 125D. Meanwhile, the other sheets, which are closer to the separator pad 125D than the lowermost sheet, are held at the position by convey resistance from the separator pad 125D and separated from the lowermost sheet. Thus, as the separator roller 125C rotates counterclockwise (see FIG. 1), the solely the lowermost sheet in the sheet stack is forwarded to the position above the image capturing element 105.

The ADF 120 is further provided with a first conveyer roller 126A in an upstream position in a vicinity of the entry side of the auto-conveyed image reader window 103, closer to the inlet of the sheet-conveying path with respect to the auto-conveyed image reader window 103, and in a downstream position with respect to the separator roller 125C and the separator pad 125D in the sheet-conveying path. As the sheet comes in contact with the first conveyer roller 126A, and the first conveyer roller 126A rotates along with the sheet, the sheet conveyed by the separator roller 125C is further forwarded in the sheet-conveying path. A pinch roller 126B, which is arranged in an opposite position from the first conveyer roller 126A across the sheet-conveying path, is a pressure roller to press the sheet against the first conveyer roller 126A and is rotated by the sheet being moved by the first conveyer roller 126A.

Further, the ADF 120 is provided with a second conveyer roller 128, in a vicinity of the exit side of the auto-conveyed image reader window 103 and in a downstream position closer to an outlet 123A of the sheet-conveying path with respect to the auto-conveyed image reader window 103. The second conveyer roller 128 forwards the sheet passed over the auto-conveyed image reader window 103 toward the outlet 123A in cooperation with a pinch roller 128A, which presses the passing-over sheet against the pinch roller 128 and is rotated by the sheet being conveyed. The sheet conveyed by the second conveyer roller 128 is turned upward (vertically approximately 180 degrees) by a guiding member (not shown) and directed to a lower-stream section Lo of the sheet-conveying path.

In the image reading apparatus 100 according to the present embodiment, a peripheral velocity of the first conveyer roller 126A is controlled to be smaller than a peripheral velocity of the second conveyer roller 128. Therefore, when the sheet is in a position to be nipped by the second conveyer roller 128 and the pinch roller 128A and by the first conveyer roller 126A and the pinch roller 126B simultaneously, the sheet is tensely stretched between the second conveyer roller 128 and the first conveyer roller 126. In other words, the sheet is tensely stretched in the position above the auto-conveyed image reader window 103, in which the original image is read by the image capturing element 105.

Figure 2:
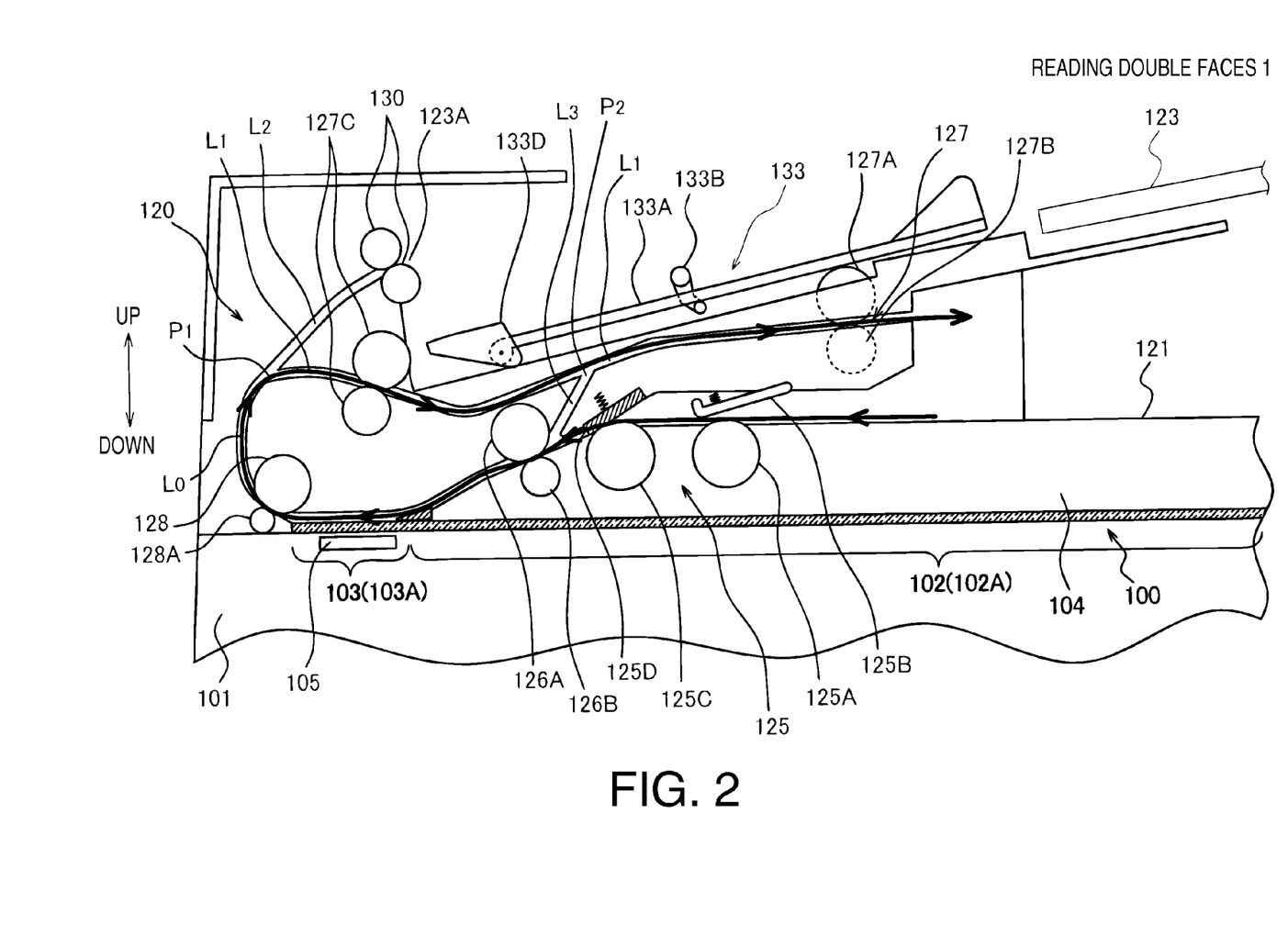
FIG. 2 is a cross-sectional view of the ADF and a sheet-conveying path to be used for first-side reading in double-face reading in an image reading apparatus according to the embodiment of the present invention.

The lower-stream section Lo of the sheet-conveyer path, which is a downstream section with respect to the second conveyer roller 128A, is vertically branched at a sprit point P1 into two paths, which are a lower path L1 and an upper path L2. The lower path L1 extends in a lower section with respect to the upper path L2 and leads the sheet to a reversing system 127. The upper path L1 extending above the lower path L1 leads the sheet to the discharge tray 123. The sheet entering the lower-stream section Lo is selectively directed to one of the lower path L1 (see FIG. 2) and the upper path L2 (see FIG. 1) by a flap (not shown), which closes the other of the lower path L1 and the upper path L2.

Figure 3:
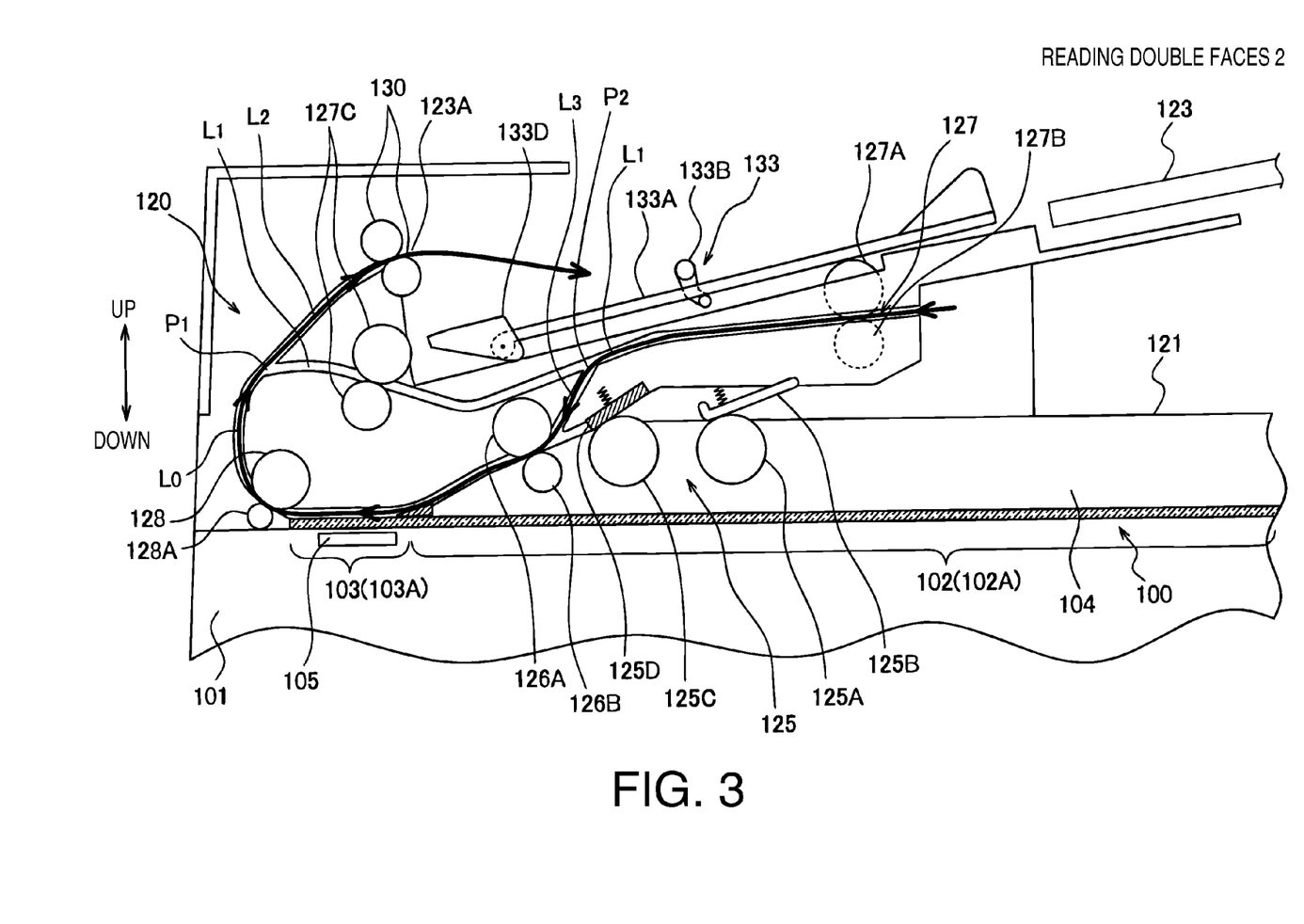
FIG. 3 is a cross-sectional view of the ADF and another sheet-conveying path to be used for second-side reading in the double-face reading in an image reading apparatus according to the embodiment of the present invention.

The reversing system 127 switches sheet-conveying directions to convey the sheet, which entered the lower-stream section Lo, and returns the sheet from the entry side to the position above the auto-conveyed image reader window 103 (see FIG. 3). The reversing system 127 includes switchback roller 127A and a pinch roller 127B. The switchback roller 127A applies conveying force to the sheet and can convey the sheet in a normal direction and a reverse direction. The pinch roller 127B presses the sheet against the switchback roller 127A and is rotated by the sheet being conveyed as the switchback roller 127A rotates.

Rotation of the switchback roller 127A in the normal direction (e.g., counterclockwise, see FIG. 2) forwards the sheet passing over the auto-conveyed image reader window 103 and conveyed by the second conveyer roller 128A in a normal conveying direction continuously in the lower path L1. Rotation of the switchback roller 127A in the reverse direction (e.g., clockwise, see FIG. 3) conveys the sheet in the lower path L1 in a reverse conveying direction opposite from the normal conveying direction. On or after a front end of the sheet being conveyed in the lower path L1 reaches the switchback roller 127A, and on or after a rear end of the sheet in the lower-stream section Lo passes through the split point P2, rotation of the switchback roller 127A is switched to the reverse direction. In this regard, the front end of the sheet in the sheet-conveying path refers to an edge of the sheet, which travels in the sheet-conveying path earlier than the other part of the sheet, and the rear end of the sheet refers to an edge of the sheet, which travels in the sheet-conveying path later than the other part of the sheet.

According to the reverse rotation of the switchback roller 127A, the sheet having been conveyed in the normal conveying direction is conveyed backward in the reverse conveying direction. When the sheet conveyed in the lower path L1 in the reverse conveying direction reaches a split point P2, the sheet is directed in a returning path L3, which directs the sheet to the first conveyer roller 126A. In this regard, a flap (not shown) closes the remaining part of the lower path L1 beyond the split point P2 to direct the sheet in the returning path L3.

The upper path L2, on the other hand, directs the sheet having been read by the image capturing element 105 to the outlet 123A, through which the sheet is ejected to be released in the discharge tray 123. Along the upper path L2, a pair of discharge rollers 130 is arranged. The discharge rollers 130 convey the sheet to be ejected through the outlet 123A.

The discharge tray 123 includes an under-slider 133, which inserts a newly-ejected sheet underneath a previously-ejected sheet in the discharge tray 123. Ejection of the newly-ejected sheet to insert underneath the previously-ejected sheet will be herein referred to as under-sliding ejection.

The under-slider 133 includes a discharge flap 133A, which is movable between a first position (see FIG. 1) and a second position (see FIG. 2) in the discharge tray 123. The discharge flap 133A is moved by a crank 133B to swing between the first position and the second position. The crank 133B is rotated by an actuator (not shown). The discharge flap 133A is provided with a projection piece 133B, which uplifts a rear end of the previously-ejected sheet in the air, on one end closer to the outlet 123A.

When the discharge flap 133A is in the first position, under-sliding ejection is activated. When the discharge flap 133A is in the second position, under-sliding ejection is inactivated, and the newly-ejected sheet is placed on top of the previously-ejected sheet.

2.2 Behaviors of the ADF

Behaviors of the ADF 120 will be described in details herein below. When a single-face reading operation, in which solely one of the two sides of the sheet is scanned, is executed, the sheet is set in the sheet-feed tray 121 with the side having the original image thereon facing downward to face the bottom of the sheet-feed tray 121. When a user presses a start button (not shown) to start the operation, the feeder system 125 are activated. Further, the discharge flap 133A is placed in the first position. Accordingly, the sheet is conveyed in the sheet-conveying path to pass over the auto-conveyed image reader window 103 to have the single side scanned, forwarded in the lower-stream section Lo and in the upper path L2, and inserted underneath a previously-ejected sheet (if any) in the discharge tray 123 (see FIG. 1).

When a double-face reading operation, in which both sides of the sheet are scanned, is executed, the sheet is set in the sheet-feed tray 121 with a first side (e.g., recto) facing downward to face the bottom of the sheet-feed tray 121. When a user presses the start button to start the operation, the feeder system 125 are activated. Further, the discharge flap 133A is placed in the second position. Accordingly, the sheet is conveyed in the sheet-conveying path to pass over the auto-conveyed image reader window 103 to have the recto side scanned, forwarded to the lower-stream section L1, and directed in the lower path L2 to the switchback roller 127A (see FIG. 2). When the rear end of the sheet passes through the split point P2, the switchback roller 127A is switched to rotate in the reverse direction. The sheet is directed in the returning path L3, and forwarded to the entry side of the auto-conveyed image reader window 103 and pass over the auto-conveyed image reader window 103 to have a second side (e.g., verso) scanned, further forwarded in the lower-stream section L2 and the upper path L2 to be ejected on top of a previously-ejected sheet (if any) in the discharge tray 123.

In this regard, according to the present embodiment, a peripheral velocity of the switchback roller 127A in the reverse rotation is controlled to be smaller than a peripheral velocity of the switchback roller 127A in the normal rotation. In other words, the switchback roller 127A rotates in a slower peripheral velocity in the reverse rotation after the rear end of the sheet passes through the split point P2 than the switchback roller 127A rotating in the normal direction before the rear end of the sheet passes through the split pint P2.

More specifically, the peripheral velocity of the switchback roller 127A in the normal rotation is substantially equivalent to peripheral velocities of the second conveyer roller 128 and the third conveyer roller 127C. Meanwhile, the peripheral velocity of the switchback roller 127A in the reverse rotation is smaller than a peripheral velocity of the first conveyer roller 126A, which is even smaller than the peripheral velocity of the second conveyer roller 128. Therefore, after completion of scanning the recto side, when the sheet is returned to the entry side of the auto-conveyed image reader window 103, convey resistance is generated in the sheet between the first conveyer roller 126A and the switchback roller 127A. Intensity of the convey-resisting force corresponds to a difference between the peripheral velocities of the first conveyer roller 126A and the switchback roller 127A.

3. Driving Mechanism of Switchback Roller

Figure 5:
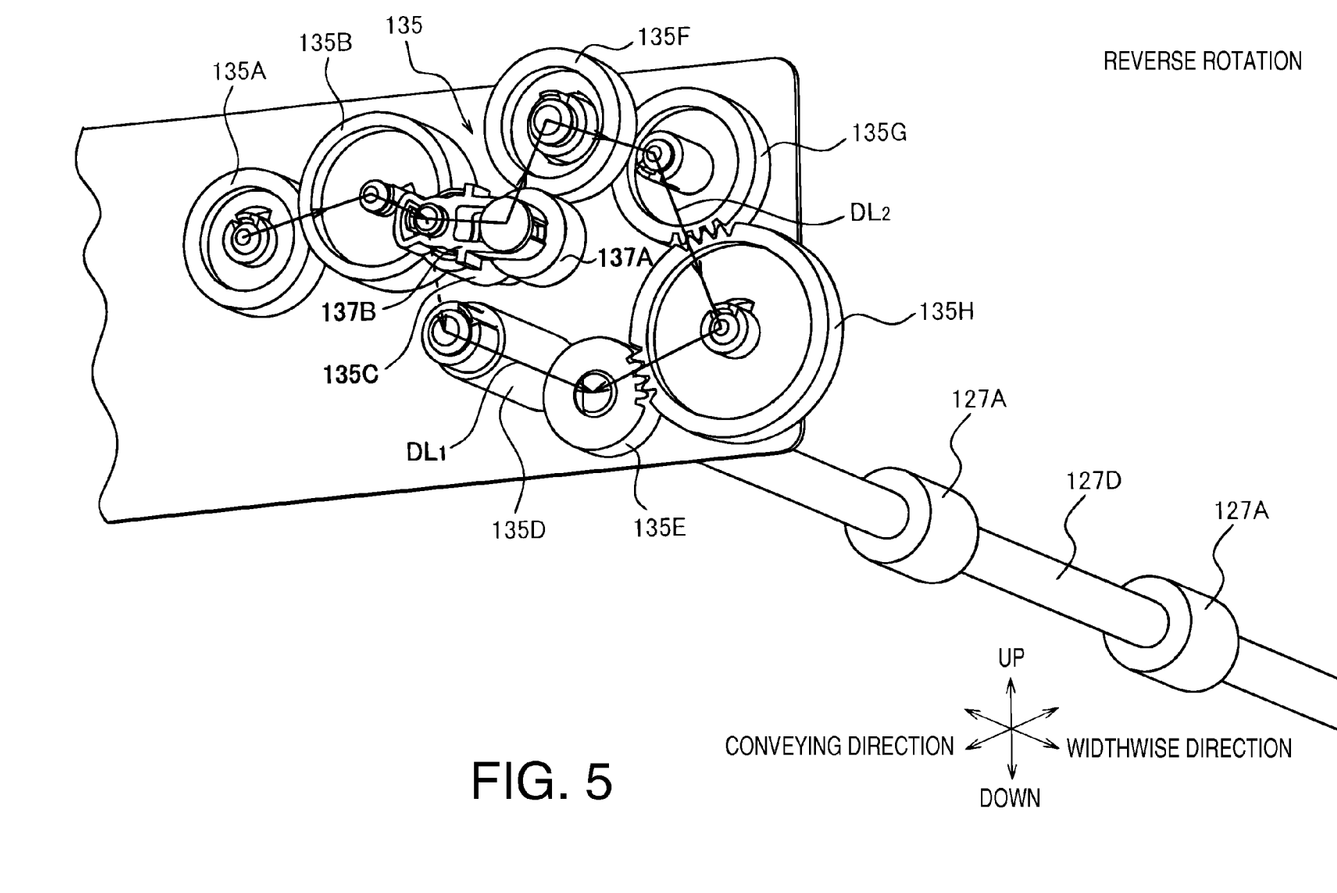
FIG. 5 is a perspective view of the transmission in reverse rotation in the image reading apparatus according to the embodiment of the present invention.
Figure 6:
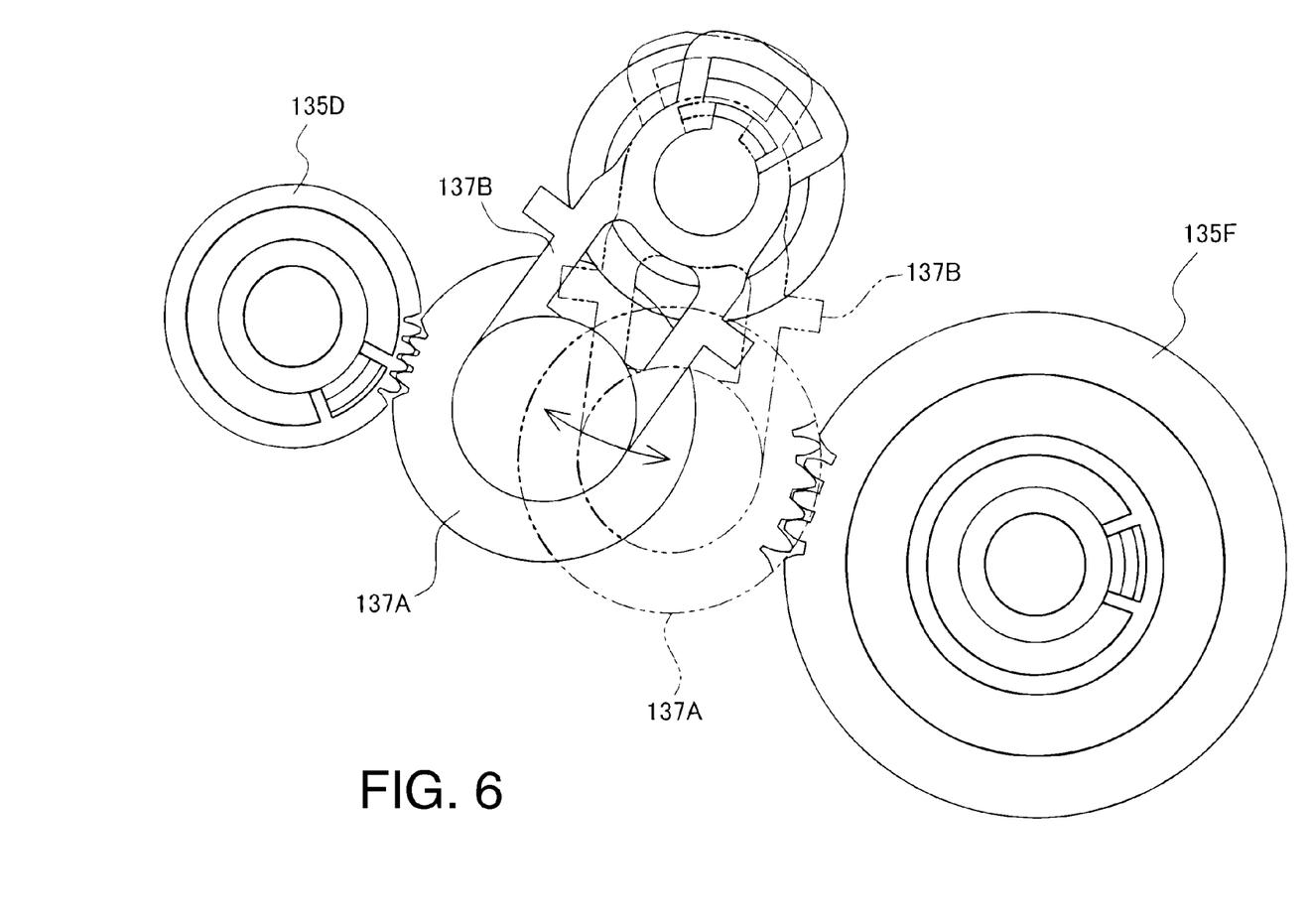
FIG. 6 is a diagram to illustrate behaviors of a planet gear in the transmission in the image reading apparatus according to the embodiment of the present invention.

Driving mechanism of the switchback roller 127A will be described with reference to FIGS. 4-6. The switchback roller 127A is rotated by driving force, which is generated in a motor (not shown) and input in the switchback roller 127A via a transmission 135 including a plurality of gears (see FIG. 4). The transmission 135 includes a normal transmission path DL1 and a reverse transmission path DL2, which are switchable from one to the other. The driving force transmitted in the transmission 135 through the normal transmission path DL1 rotates the switchback roller 127A in the normal direction, and the driving force transmitted through the reverse transmission path DL 2 rotates the switchback roller 127A in the reverse direction.

The plurality of gears in the transmission 135 include a gear 135A, a gear 135B, a sun gear 135C, a planet gear 137A, a normal-rotation input gear 135D, and a reverse-rotation input gear 135F. The sun gear 135C is arranged in a position closer to the drive source with respect to the planet gear 137A, and meshed with the gear 135B at one end and with the planet gear 137A at the other end. The planet gear 137A is swingable about an axis of the sun gear 135C to be meshed with one of the normal-rotation input gear 135D and the reverse-rotation input gear 135F.

The normal transmission path DL1 and the reverse transmission path DL2 can be switched by the positions of the planet gear 137A. When the planet gear 137A is in a position to mesh with the normal-rotation input gear 135D, as indicated by solid lines in FIG. 6, the normal transmission path DL1 is established, and when the planet gear 137B is in a position to mesh with the reverse-rotation input gear 135F, as indicated by double-dotted lines in FIG. 6, the reverse transmission path DL2 is established.

Figure 4:
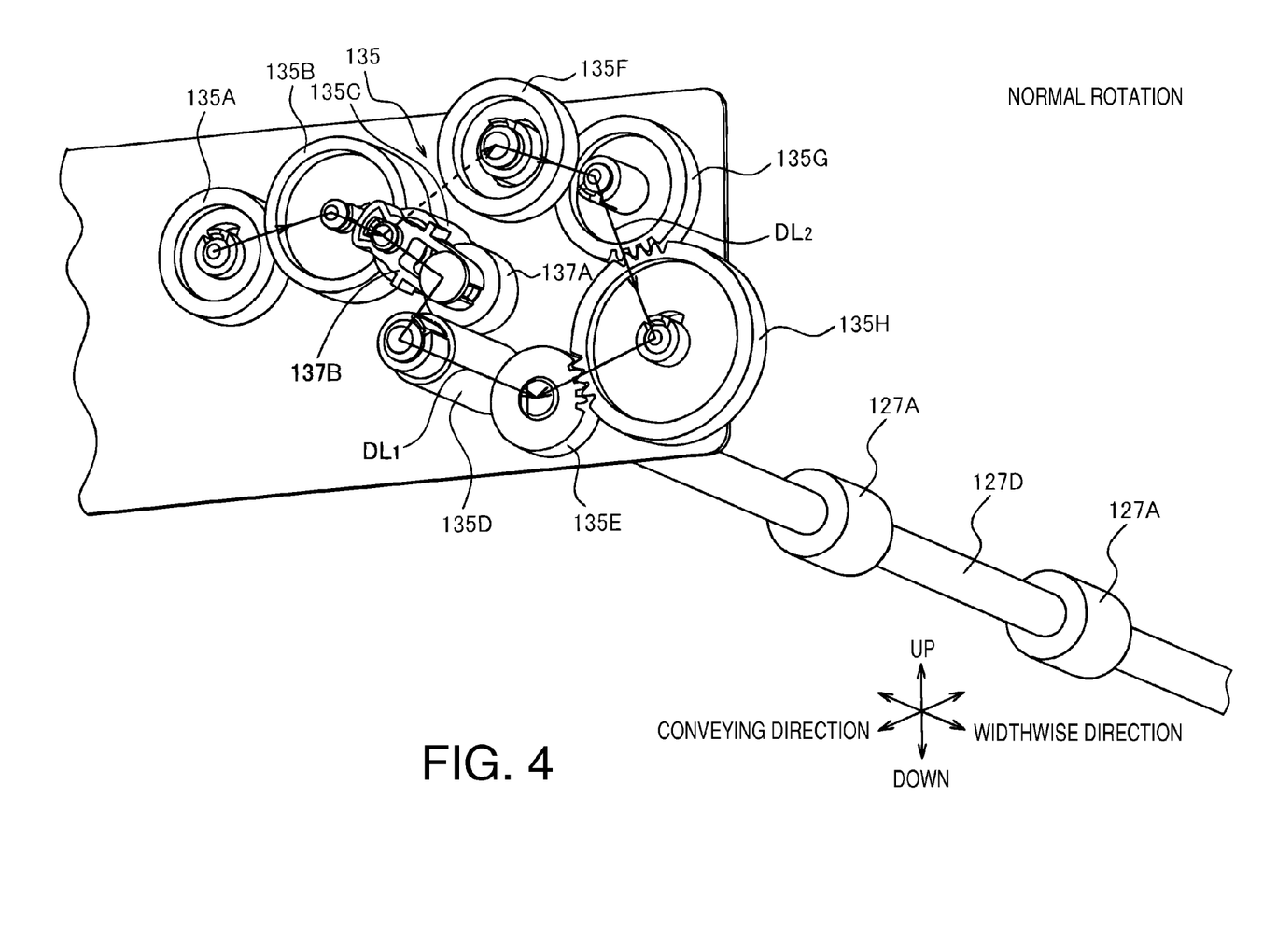
FIG. 4 is a perspective view of a transmission in normal rotation in the image reading apparatus according to the embodiment of the present invention.

That is, when the planet gear 137A is meshed with the normal-rotation input gear 135D, the driving force is transmitted through the gear 135A, the gear 135B, the sun gear 135C, the planet gear 137A, the normal-rotation input gear 135D, and a gear 135E, in the order described (see FIG. 4). Whilst the gear 135E is rotatable integrally with a rotation shaft 127D of the switchback roller 127A, the switchback roller 127A is rotated in the normal direction.

Meanwhile, when the planet gear 137A is meshed with the reverse-rotation input gear 135F, the driving force is transmitted through the gear 135A, the gear 135B, the sun gear 135C, the planet gear 137A, the reverse-rotation input gear 135F, a gear 135G, a gear 135H, and the gear 135E, in the order described (see FIG. 5), to the rotation shaft 127D of the switchback roller 127A. Accordingly, the switchback roller 127A is rotated in the reverse direction.

The transmission 135 is designed to have a gear reduction rate in the reverse transmission path DL 2 to be greater than a gear reduction rate in the normal transmission path DL1. Therefore, the peripheral velocity of the switchback roller 127A in the reverse rotation is smaller than the peripheral velocity of the switchback roller 127A in the normal rotation. More specifically, the peripheral velocity of the switchback roller 127A in the reverse rotation is reduced to be smaller than the peripheral velocity of the first conveyer roller 126A, and it is preferable that ration of the peripheral velocity of the switchback roller 127A in the reverse rotation to the peripheral velocity of the first conveyer roller 126A is set in a range approximately between 50% and 70%.

Whilst the planet gear 137A is meshed with the sun gear 135C, the planet gear 137A is supported by arms 137B, which are rotatably attached to the rotation shaft of the sun gear 135C to rotate about the rotation shaft of the sun gear 135C, to be inseparable from the sun gear 135C. Therefore, when the planet gear 137A is affected by reaction force from the sun gear 135C, the planet gear 137A tends to revolve around the sun gear 135C about the rotation axis of the sun gear 135C. The revolving behavior of the planet gear 137 places the planet gear 137 in the position to mesh with one of the normal-rotation input gear 135D and the reverse-rotation input gear 135F, and when the rotating direction of the sun gear 135C is switched from one to the other, the positions of the planet gear 137 are switched from the one to the other. Thus, the transmission paths in the transmission 135 are switched from the normal transmission path DL1 to the reverse transmission path DL 2, and vice versa.

The rotation shaft 127D of the switchback roller 127A extends in parallel with a widthwise direction of the sheet, which is a direction perpendicular to the sheet-conveying direction and to a direction of thickness of the sheet. The rotation shaft 127D has a plurality (e.g., two) of the integrally rotatable switchback rollers 127A. The plurality of switchback rollers 127A are arranged to have contact sections thereof, which are to become in contact with the sheet being conveyed, in symmetrical positions on the rotation shaft 127D with respect to a center of the width of the sheet.

4. Effects

In a conventional image reading apparatus, in which the sheets are separated from the sheet stack one-by-one by applying the convey-resisting force, a first sheet-conveying speed to convey the sheet to have a first side (e.g., the recto) scanned by the image capturing element 105 at the position of the auto-conveyed image reader window 103 and a second sheet-conveying speed to convey the sheet to have a second side (e.g., the verso) scanned at the position of the auto-conveyed image reader window 103 tend to be different, and the speed difference may be caused by the convey-resisting force generated in the feeder system 125, specifically, in the separator pad 125D.

In particular, when the first side of the sheet is scanned, the sheet is initially fed in the sheet-conveying path by the feeder system 125. Therefore, the sheet is affected by the convey-resisting force of the feeder system 125 for a predetermined length of time, which corresponds to a length of the sheet, after the front end of the sheet reaches the position of the auto-conveyed image reader window 103 until the sheet proceeds further in the sheet-conveying path and the rear end of the sheet is released from the feeder system 125. When the second side of the sheet is scanned, the sheet having been released from the feeder system 125 is not affected by the convey-resisting force applied by the feeder system 125. Accordingly, the sheet can be conveyed in the faster speed when the second side is scanned.

Meanwhile, according to the image reading apparatus 100 of the present embodiment, the peripheral velocity of the switchback roller 127A to return the sheet passed over the auto-conveyed image reader window 103 in the sheet-conveying path is controlled to be smaller than the peripheral velocity of the first conveyer roller 126A. In other words, convey-resisting force is applied to the sheet, of which first side has been scanned, by the switchback roller 127A. Therefore, the difference between the first sheet-conveying speed and the second sheet-conveying speed can be reduced, and magnification ratios of reproduced images to the original images between the first side and the second side of the sheet can be restricted from being significantly different from each other but can be maintained to be closer to each other.

According to the present embodiment, it is preferable that the peripheral velocity of the switchback roller 127A is designed such that the convey-resisting force to be generated in the range between the feeder system 125 and the first conveyer roller 126A is equivalent to the convey-resisting force to be generated in the range between the switchback roller 127A and the first conveyer roller 126A.

In the image reading apparatus 100 according to the present embodiment, the convey-resisting force is generated and applied effectively to the sheet being returned to the image capturing element by utilizing a conventionally-existing switchback roller, which has been required for conveying the sheet in the reversed orientation. Thus, the magnification ratios of reproduced images to the original images between the first side and the second side of the sheet can be restricted from being significantly different from each other but can be maintained to be closer to each other by modifying the conventional image reading apparatus.

According to the present embodiment, transmission gear ratios of the transmission 135 are different between the normal transmission path DL1 and the reverse transmission path DL2; therefore, the peripheral velocity of the switchback roller 127A in the reverse rotation can be reduced to be smaller. Thus, magnification ratios of reproduced images to the original images between the first side and the second side of the sheet can be restricted from being significantly different from each other by switching the transmission paths, in other words, by switching the rotating directions of the motor.

According to the present embodiment, the switchback rollers 127A are arranged in positions to have the contact portions thereof in symmetrical positions with respect to the center of the width of the sheet being conveyed. Therefore, the convey-resisting force can be evenly applied to the sheet being conveyed, and the sheet can be prevented from being conveyed in skewed orientation with respect to the sheet-conveying direction.

Second Embodiment

Figure 7:
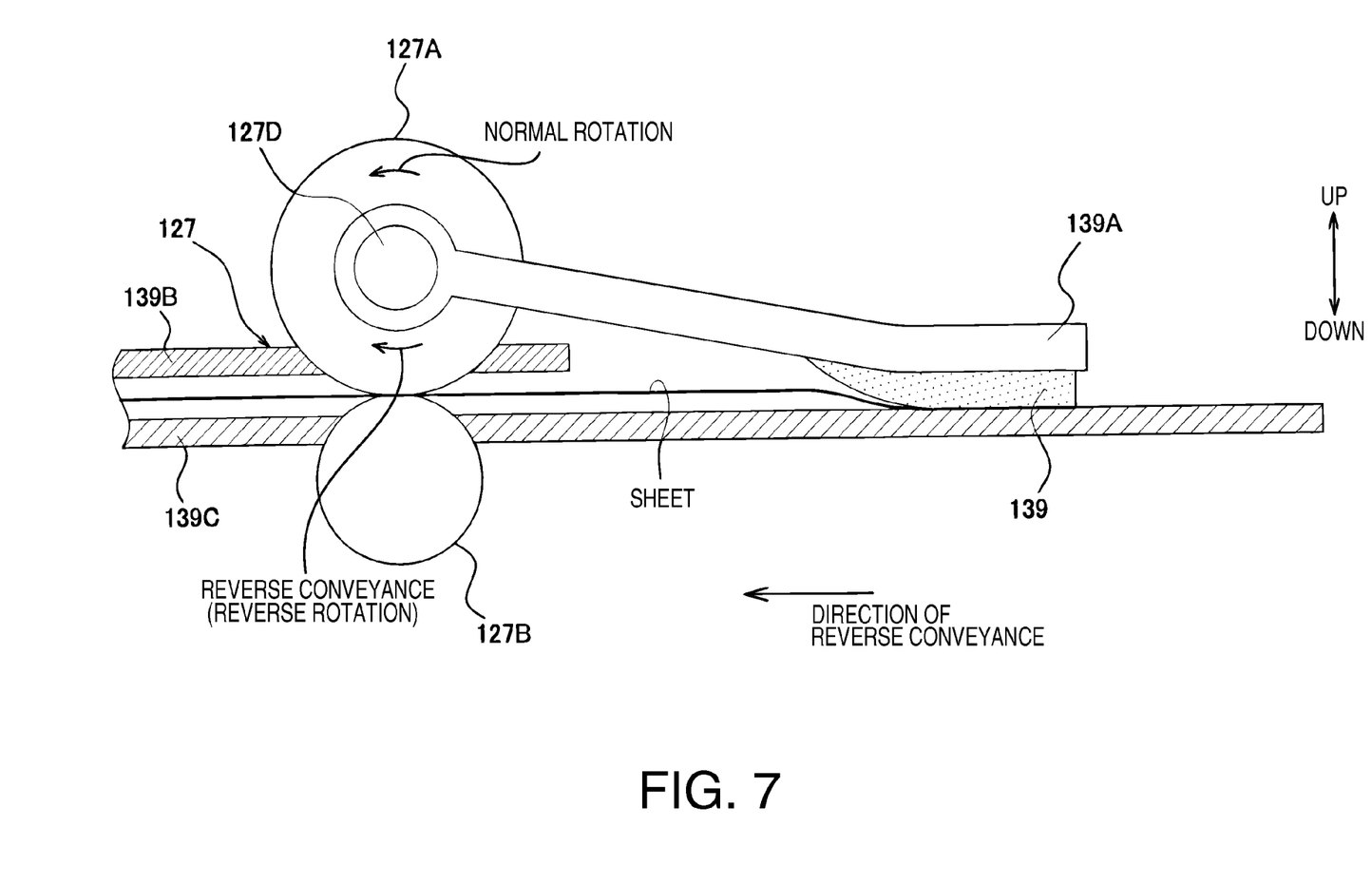
FIG. 7 is a diagram to illustrate a convey resistance generating mechanism according to a second embodiment of the present invention.

A second embodiment of the present invention will be described with reference to FIG. 7. In the second embodiment, the image reading apparatus 1 is provided with a friction generator 139. The friction generator 139 creates friction with the sheet being returned to the auto-conveyed image reader window 103. When the image reading apparatus 1 is provided with the friction generator 139, the peripheral velocities of the switchback roller 127 in the normal rotation and the reverse rotation may be equivalent. A sheet guide 139C and a sheet guide 139B guide the sheet being conveyed in the lower path L1.

The friction generator 139 is attached to an end of an arm 139A, which extends from the rotation shaft 127D of the switchback roller 127A and is rotatable about the rotation shaft 127D. The arm 139A extends rearward in the direction of the reverse-conveying direction of the sheet. The arm 139A tends to rotate along with the rotation of the switchback roller 127 due to friction generated between the rotation shaft 127D and the arm 139A; therefore, when the switchback roller 127A is in reverse rotation to return the sheet in the returning path L3, the friction generator 139 is pressed downward against the sheet and the sheet guide 139C. Thus, friction is created between the friction generator 139 and the sheet, and resisting force is applied to the sheet being conveyed. When the switchback roller 127A is in normal rotation, the arm 139A tends to be apart from the sheet guide 139C, and the sheet being conveyed in the normal-conveying direction is allowed to be conveyed in between the friction generator 139 and the sheet guide 139C.

Thus, convey-resisting force can be generated and applied specifically to the sheet being returned to the auto-conveyed image reader window 103, and magnification ratios of reproduced images to the original images between the first side and the second side of the sheet can be restricted from being significantly different from each other.

Third Embodiment

Figure 8:
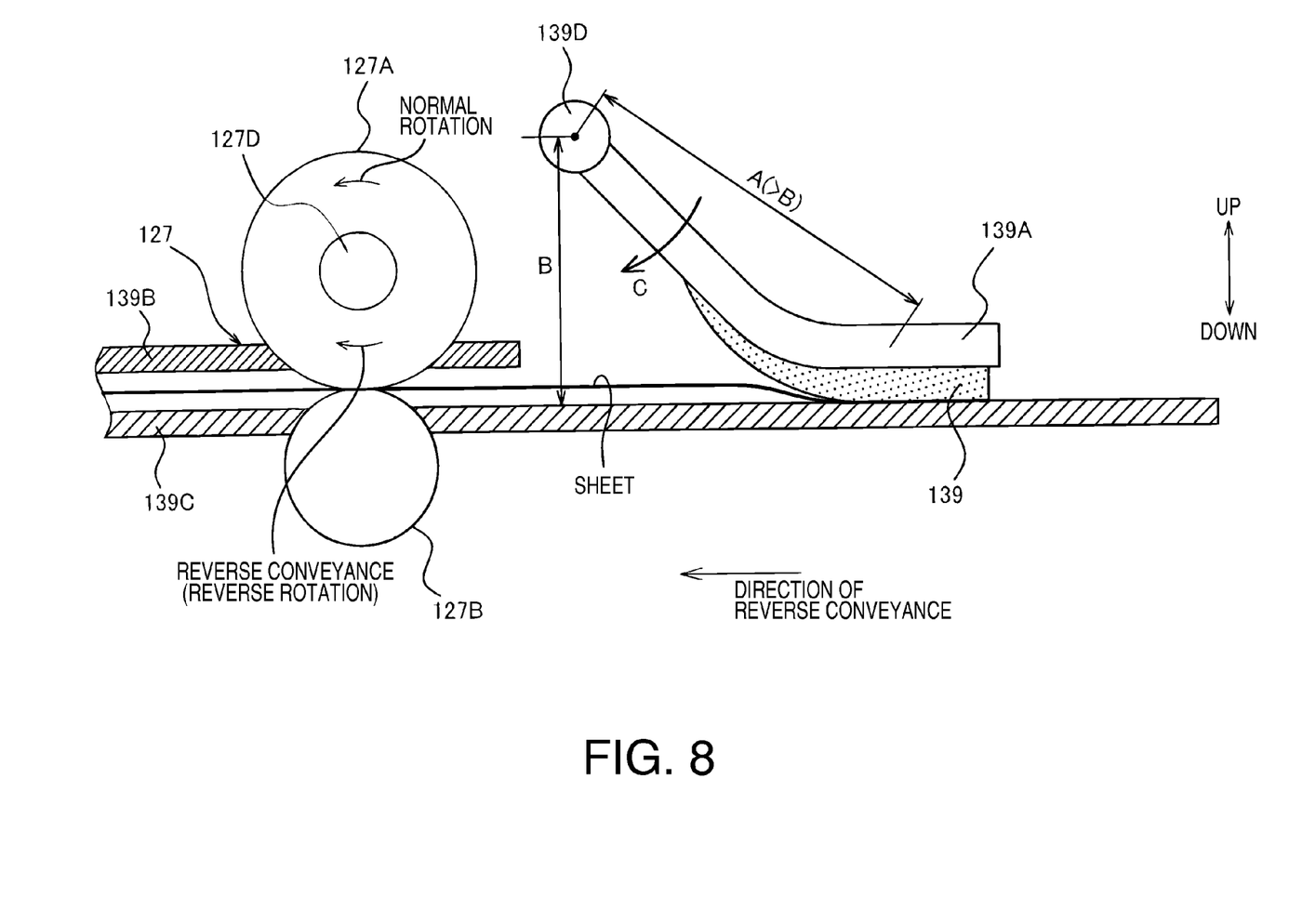
FIG. 8 is a diagram to illustrate a convey resistance generating mechanism according to a second embodiment of the present invention.

A third embodiment of the present invention will be described with reference to FIG. 8. In the third embodiment, the image reading apparatus 1 is provided with the arm 139A with the friction generator 139, but a rotation shaft 139D of the arm 139A is displaced from the rotation shaft 127D of the switchback roller 127A and in a rear position with respect to the switchback roller 127A in the reverse-conveying direction of the sheet. According to the third embodiment, distance A between the rotation shaft 139D and the friction generator 139 is greater than distance B between the rotation shaft 139D and the sheet guide 139C.

In this configuration, the friction generator 139 is pressed downward by the weight of the friction generator 139 itself and of the arm 139D regardless of the rotating directions of the switchback roller 127A. When the switchback roller 127 is in normal rotation, the sheet being conveyed in the normal-conveying direction proceeds the position between the friction generator 139 and the sheet guide 139C against the pressure from the friction generator 139 and friction generated between the sheet and the friction generator 139. When the rotating directions of the switchback roller 127 are switched, and when the sheet is conveyed in the reverse-conveying direction, friction generated between the sheet and the friction generator 139 pulls the arm 139A downward to rotate in a direction C indicated in FIG. 8. In this regard, however, the sheet guide 139C restricts the arm 139A from rotating further beyond the sheet guide 139C, and the contact pressure from the friction generator 139 increases to be greater than the pressure applied to the sheet being conveyed in the normal-conveying direction. Therefore, friction resistance in the sheet being conveyed in the reverse-conveying direction increases.

Thus, convey-resisting force can be generated and applied to the sheet being returned to the auto-conveyed image reader window 103, and magnification ratios of reproduced images to the original images between the first side and the second side of the sheet can be restricted from being significantly different from each other.

More Examples

Although examples of carrying out the invention have been described, those skilled in the art will appreciate that there are numerous variations and permutations of the image reading apparatus that fall within the spirit and scope of the invention as set forth in the appended claims. It is to be understood that the subject matter defined in the appended claims is not necessarily limited to the specific features or act described above.

Rather, the specific features and acts described above are disclosed as example forms of implementing the claims.

For example, in the first embodiment described above, the conveying directions of the sheet are switched by the single switchback roller 127A. However, the single switchback roller 127A may be replaced with two separately activated rollers, one of which is activated for normal-conveyance and the other of which is activated for reverse-conveyance.

For another example, the feeder system 125 may not necessarily be equipped with the under-sliding function.

Further, the normal transmission path DL1 and the reverse transmission path DL2 may not necessarily be switched by the rotating directions of the sun gear 135C. For example, the arms 137B may be manipulated by an actuator (e.g., solenoid) to swing to be selectively engaged with one of the normal-rotation input gear 135D and the reverse-rotation input gear 135F.

What is claimed is:

1. An image reading apparatus, which is capable of conveying a sheet in a sheet-conveying path along an image reader unit in a predetermined sheet-conveying direction to scan a first side of the sheet passing by the image reader unit and returning the passed-by sheet to the image reader unit to scan a second side of the sheet after scanning the first side of the sheet, comprising:
    a sheet tray, in which the sheet to be scanned is stored;
    a separator, which is configured to frictionally pick up the sheet from the sheet tray and convey the picked-up sheet toward an entry side of the image reader unit, through which the sheet enters a position above the image reader unit, to have the first side of the sheet scanned by the image reader unit;
    a conveyer roller, which is arranged along the sheet-conveying path in the vicinity of the entry side of the image reader unit and is configured to rotate along with the sheet becoming in contact with the conveyer roller to convey the sheet in the sheet-conveying path to the image reader unit;
    a resisting force applier, which is configured to apply convey-resisting force to the sheet, of which first side has been scanned, being returned to the entry side of the image reader unit to have the second side of the sheet with the convey resistance scanned by the image reader unit; and
    a transmission,
    wherein the resisting force applier includes a returner roller, which is configured to rotate along with the sheet, of which first side has been scanned, becoming in contact with the returner roller and return the sheet to the conveyer roller; and
    wherein a peripheral velocity of the returner roller is smaller than a peripheral velocity of the conveyer roller;
    wherein the returner roller is a switchback roller, which is configured to switch rotating directions thereof from a normal rotating direction to a reverse rotating direction once a front end of the sheet being conveyed in the predetermined sheet-conveying direction reaches the returner roller to return the sheet to the conveyor roller;
    wherein the transmission includes a plurality of gears to transmit driving force from a drive source for rotating the returner roller and is configured to switch the rotating directions of the returner roller by switching transmission paths to transmit the driving force between a normal transmission path, in which the driving force for rotating the returner roller in the normal rotating direction is transmitted, and a reverse transmission path, in which the driving force for rotating the returner roller in the reverse rotating direction is transmitted; and
    wherein the peripheral velocity of the returner roller rotated in the reverse rotating direction to return the sheet to the conveyor roller is controlled to be smaller than the peripheral velocity of the returner roller rotated in the normal direction by setting a different transmission gear ratio in the reverse transmission path from a gear transmission ratio of the normal transmission path.

2. The image reading apparatus according to claim 1, wherein the transmission includes:
    a sun gear, in which the driving force from the drive source is input;
    a planet gear, which is meshed with the sun gear and rotates about an axis, the axis being swingable about an axis of the sun gear between a first position and a second position;
    a normal-rotation input gear, which is included in the normal transmission path and becomes meshed with the planet gear being in the first position; and
    a reverse-rotation input gear, which is included in the reverse transmission path and becomes meshed with the planet gear being in the second position,
    wherein the planet gear swinging between the first position and the second position switches the transmission paths between the normal transmission path and the second transmission path.

3. The image reading apparatus according to claim 1, wherein the returner roller has contact sections, which become in contact with the sheet being conveyed, in symmetrical positions along a widthwise direction of the sheet being conveyed with respect to a widthwise center of the sheet, the widthwise direction of the sheet being a direction perpendicular to the predetermined sheet-conveying direction and to a direction of thickness of the sheet being conveyed.

4. The image reading apparatus according to claim 1, further comprising:
    a friction generator, which contacts the sheet being returned to the image reader unit to generate friction with the sheet;
    wherein the friction generator includes the resisting force applier.

5. The image reading apparatus according to claim 4, further comprising:
    an arm, which extends rearward in a direction of the returning sheet being returned toward the entry side of the image reader unit and is rotatably attached to a rotation shaft of the returner roller to rotate along with the returner roller,
    wherein the friction generator is arranged at a rear end of the arm; and
    wherein the arm is rotated by friction generated between the rotation shaft and the arm to have the friction generator pressed against the sheet being returned to the image reader unit.

* * * * *